US008874731B1

(12) United States Patent
Puppin

(10) Patent No.: US 8,874,731 B1
(45) Date of Patent: Oct. 28, 2014

(54) USE OF TIMING INFORMATION FOR DOCUMENT UNDERSTANDING

(75) Inventor: Diego Puppin, Arlington, MA (US)

(73) Assignee: Google Inc., Mountain View, CA (US)

(*) Notice: Subject to any disclaimer, the term of this patent is extended or adjusted under 35 U.S.C. 154(b) by 132 days.

(21) Appl. No.: 13/246,790

(22) Filed: Sep. 27, 2011

(51) Int. Cl.
G06F 15/173 (2006.01)

(52) U.S. Cl.
USPC ............ 709/224; 709/203; 709/223; 707/736

(58) Field of Classification Search
CPC ......... H04L 67/22; G06F 17/40; G06F 19/00; G06Q 30/0201; G06Q 30/0254; G09B 5/00; G09B 17/003
USPC .......... 709/224, 223, 203; 715/776, 784, 803; 705/14.53; 707/1, 736
See application file for complete search history.

(56) References Cited

U.S. PATENT DOCUMENTS

| 8,260,915 | B1* | 9/2012 | Ashear ........................... 709/224 |
| 2004/0049571 | A1* | 3/2004 | Johnson et al. ................ 709/224 |
| 2006/0161511 | A1* | 7/2006 | Berstis et al. ...................... 707/1 |
| 2008/0275871 | A1* | 11/2008 | Berstis et al. ...................... 707/5 |
| 2011/0066965 | A1* | 3/2011 | Choi .............................. 715/776 |
| 2011/0087955 | A1* | 4/2011 | Ho et al. ........................ 715/230 |
| 2011/0313892 | A1* | 12/2011 | Dicke et al. ................... 705/27.2 |
| 2012/0023095 | A1* | 1/2012 | Wadycki et al. ............... 707/723 |
| 2012/0054672 | A1* | 3/2012 | McDowell ...................... 715/784 |
| 2012/0173659 | A1* | 7/2012 | Thaxter et al. ................ 709/217 |
| 2012/0210203 | A1* | 8/2012 | Kandekar et al. ............. 715/230 |
| 2012/0324393 | A1* | 12/2012 | Mbenkum et al. ............ 715/776 |

OTHER PUBLICATIONS

U.S. Appl. No. 61/350,965, filed Jun. 3, 2010, 61 pages.

* cited by examiner

Primary Examiner — Liangche A Wang
Assistant Examiner — Abdulkader M Alriyashi
(74) Attorney, Agent, or Firm — Fenwick & West LLP

(57) ABSTRACT

Reading data for an eBook are used to generate interest information for the eBook. Timing reports are received from a plurality of clients used by a plurality of users to read the eBook. The timing reports describe behaviors of the users with respect to sections of the eBook. For example, the behaviors may include reading time intervals for sections of the eBook. The timing reports are analyzed to generate interest information for the eBook. The interest information indicates relative interest in the sections of the eBook expressed by the users. The interest information may indicate which pages of eBooks are attracting the most attention from users or which pages are being read at a speed indicating interest. The generated interest information for the eBook is stored.

15 Claims, 6 Drawing Sheets

USE OF TIMING INFORMATION FOR DOCUMENT UNDERSTANDING

1. FIELD OF DISCLOSURE

The invention generally relates to electronic books (eBooks) and particularly relates to collection and analysis of timing information and interest information for the reading of such books.

2. BACKGROUND INFORMATION

Many people are transitioning from reading physical books to reading eBooks, which have many advantages over physical books, such as more portability, the ability to access the eBook from multiple electronic devices, and text search capability. In addition, eBooks are easier to purchase and are perceived as environmentally-friendly.

However, eBooks also suffer some drawbacks in comparison to physical books. For example, readers are often unable to browse an eBook before deciding whether to purchase it. Sometimes manually-selected sections of eBooks are made available to readers as samples. However, manual selection does not scale well and thus is poorly-suited for marketplaces that sell many eBooks. The sample sections may also be selected using automated techniques, but such techniques often fail to select the sections likely to be of greatest interest to readers. Accurate selection of interesting sample sections can assist the reader in determining whether to purchase a book or in ascertaining the nature of the book.

SUMMARY OF THE INVENTION

The above and other issues are addressed by a computer-implemented method, a computer system, and a non-transitory computer-readable storage medium for generating interest information for an eBook. An embodiment of the method includes receiving timing reports from a plurality of clients used by a plurality of users to read the eBook. The timing reports describe behaviors of the users with respect to sections of the eBook. The method also includes analyzing the timing reports for the eBook to generate interest information for the eBook. The interest information indicates relative interest in the sections of the eBook expressed by the users. The generated interest information for the eBook is stored.

An embodiment of the computer system for generating interest information for an eBook includes a non-transitory computer-readable storage medium having executable computer program instructions. The instructions include instructions for receiving timing reports from a plurality of clients used by a plurality of users to read the eBook. The timing reports describe behaviors of the users with respect to sections of the eBook. The instructions further include analyzing the timing reports for the eBook to generate interest information for the eBook. The interest information indicates relative interest in the sections of the eBook expressed by the users. The generated interest information for the eBook is stored. The computer system also includes a processor for executing the computer-program instructions.

An embodiment of the medium stores executable computer program instructions for generating interest information for an eBook. The instructions perform steps including receiving timing reports from a plurality of clients used by a plurality of users to read the eBook. The timing reports describe behaviors of the users with respect to sections of the eBook. The steps further include analyzing the timing reports for the eBook to generate interest information for the eBook. The interest information indicates relative interest in the sections of the eBook expressed by the users. The generated interest information for the eBook is stored.

DETAILED DESCRIPTION

The figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
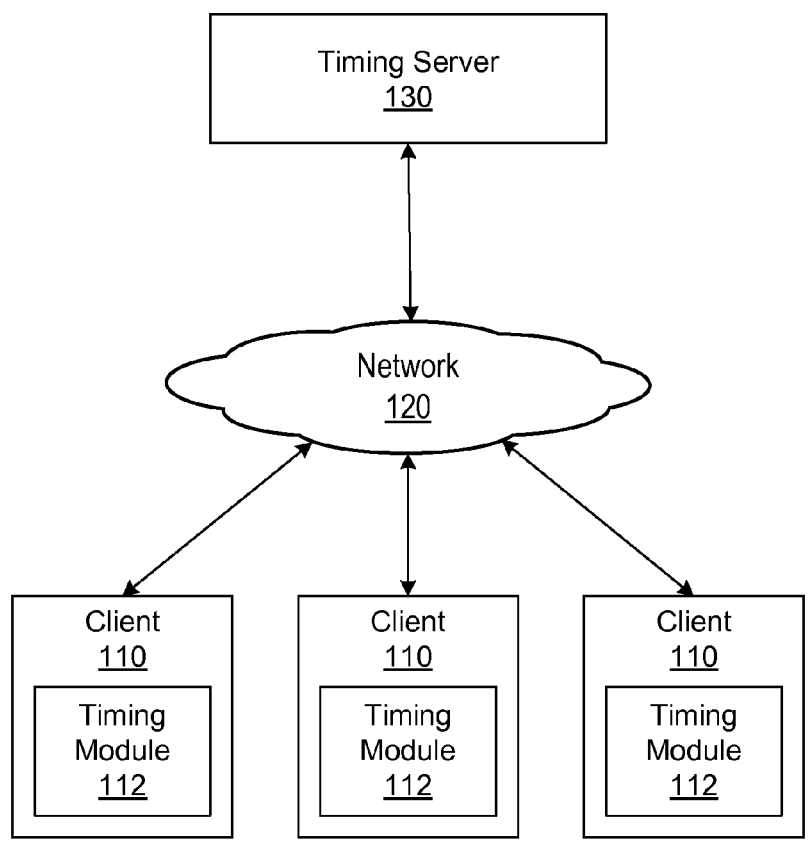
FIG. 1 is a high-level block diagram illustrating an environment for using eBook reading data for document understanding according to one embodiment.

FIG. 1 is a high-level block diagram illustrating an environment 100 for using eBook reading data for document understanding according to one embodiment. As shown, the environment 100 includes multiple clients 110 connected to a timing server 130 via a network 120. While only one timing server 130 and three clients 110 are shown in FIG. 1 for clarity, embodiments can have multiple servers and many clients. Moreover, the timing server 130 may be implemented as a cloud-based service distributed across multiple physical servers.

The clients 110 are electronic devices used by one or more users to read eBooks. A client 110 can be, for example, a mobile phone, desktop, laptop, or tablet computer, or a dedicated eBook reader ("eReader"). The client 110 may execute one or more applications that support activities including reading eBooks and browsing and obtaining content available from servers on the network 120. For example, in one embodiment the client 110 is a computer running a web browser displaying eBook content from a remote website on the network 120. An eBook is a form of electronic content that is primarily textual in nature. The content of an eBook may be, for example, a novel, a textbook, or a reference book. As used herein, the term "eBook" also includes other electronic content that is primarily textual, such as magazines, journals, newspapers, or other publications.

The clients 110 include display screens that show sections of eBooks to the users. The section of text shown on a display screen at one time is referred to as a "page" of the eBook. The amount of text shown on a page by a given client 110 depends upon multiple variables including the size of the client's display screen and characteristics of the text such as typeface, font size, margin spacing and line spacing.

The user of a client 110 changes the pages of an eBook by issuing page-turn commands. The type of command issued by the user can vary based on the client 110. For example, some clients 110 have physical page turn buttons that the user presses to advance to the next or previous page. Other clients 110 have touch-sensitive display screens and the user issues a page-turn command by gesturing on the screen.

In one embodiment, the clients 110 include timing modules 112 that record the time intervals (i.e., elapsed time) between page-turn commands issued by the users. Depending upon the embodiment, the timing modules 112 can be integrated into firmware executed by the clients 110, integrated into operating systems executed by the clients, or contained within applications executed by the clients. For example, a timing module 112 may be implemented as JAVASCRIPT code executed by a web browser on a client 110.

During normal use of the client 110 for reading an eBook, the user will issue page-turn commands as the user reads each page and advances to the next page. The time interval between sequential forward page-turn commands issued by a user is a proxy for the amount of time it took the user to read the text on the page. Hence, the time interval is referred to as a "reading time interval." The reading time interval will vary for different users having different reading speeds, and will also vary depending upon the amount of text shown on each page and the complexity of the text. The timing modules 112 send timing reports to the timing server 130 describing the recorded reading time intervals for pages of eBooks and other related information describing users' behaviors with respect to eBooks.

The timing server 130 is a computer or other electronic device that analyzes the timing reports to generate timing and interest information describing the eBooks and users. The timing server 130 may be operated by an entity that provides eBooks and other electronic content to the clients 110 or may be operated by a different entity.

In general, the timing information includes statistics describing the reading speeds of the users. For example, the timing server 130 may use the timing reports received from the various clients 110 to determine the average time required by a group of users to read a given section of an eBook, and to determine the reading speeds of individual users. In one embodiment, the timing server 130 provides the timing information to the timing modules 112 of the clients 110. The timing modules 112, in turn, use the timing information to provide timing data to the users that enhance the users' reading experiences. For example, a timing module 112 can use the timing information to display individual reading statistics for the user, as well as a dashboard comparing the user's reading statistics with equivalent statistics for other users.

The interest information generated by the timing server 130 describes relative interests expressed by the users in particular sections of eBooks. In one embodiment, the timing server 130 uses the timing information to generate interest information indicating which pages of eBooks are attracting the most attention from users. The timing server 130 may also generate related information, such as information indicating at which point users tend to abandon a book (e.g., for a day or permanently). The timing server 130 may provide the interest information to eBook publishers, marketers, sellers and other parties. These parties may then use the interest information to determine how users are reading the book, and, e.g., to aid in the selection of sections of the book to provide as previews to potential buyers of the eBooks.

The network 120 represents the communication pathway between the timing server 130 and clients 110. In one embodiment, the network 120 uses standard communications technologies or protocols and can include the Internet. Thus, the network 120 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 120 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 120 can be represented using technologies or formats including image data in binary form (e.g. Portable Network Graphics (PNG), hypertext markup language (HTML), extensible markup language (XML), etc.). In addition, all or some links can be encrypted using conventional encryption technologies such as secure sockets layer (SSL), transport layer security (TLS), virtual private networks (VPNs), Internet Protocol security (IPsec), etc. In another embodiment, the entities on the network 120 can use custom or dedicated data communications technologies instead of, or in addition to, the ones described above.

Figure 2:
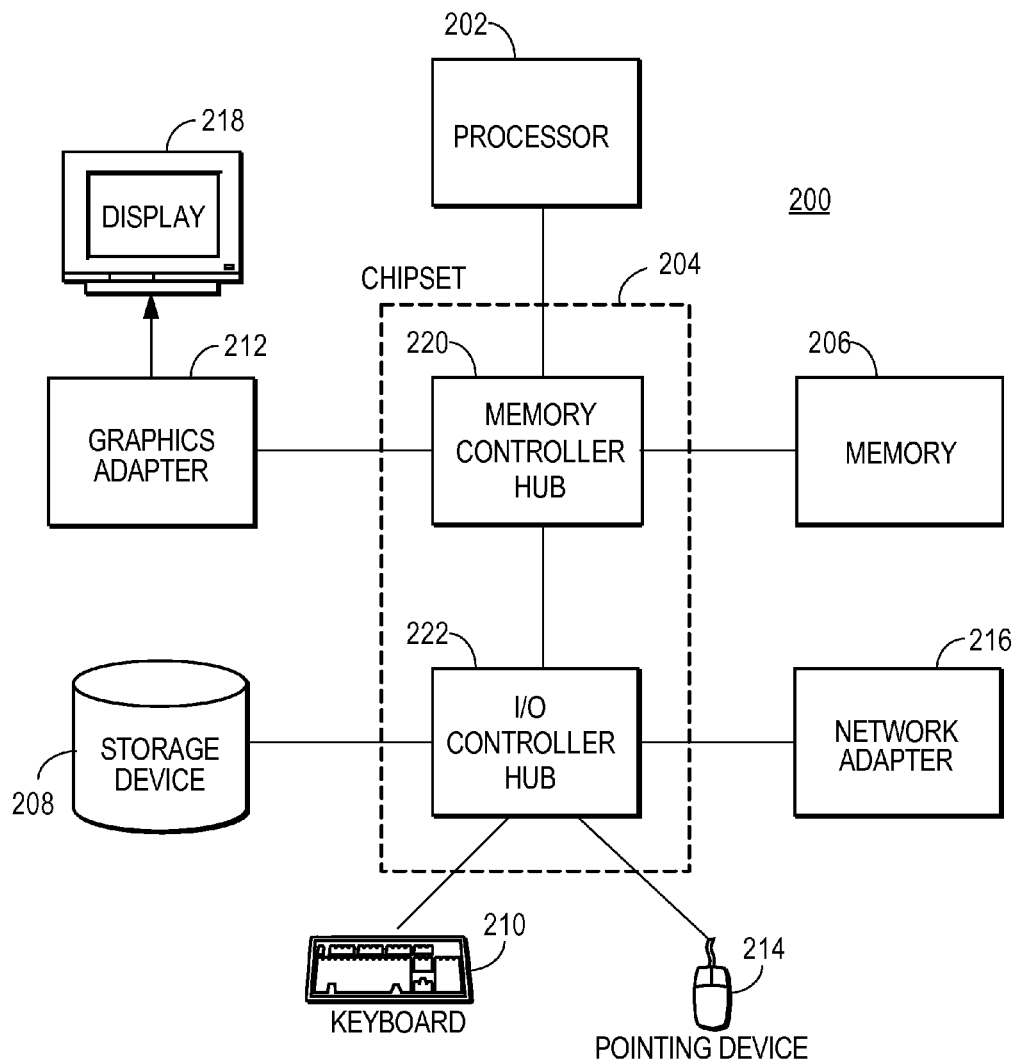
FIG. 2 is a high-level block diagram illustrating an example of a computer for use as a timing server or a client according to one embodiment.

FIG. 2 is a high-level block diagram illustrating an example of a computer 200 for use as a timing server 130 or a client 110 according to one embodiment. Illustrated is at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer 200. The graphics adapter 212 displays images and other information on the display device 218. In some embodiments, the display device 218 includes touch screen capability for receiving user input and selections. The network adapter 216 couples the computer system 200 to the network 120. Some embodiments of the computer 200 have different or other components than those shown in FIG. 2. For example, the timing server 130 can be formed of multiple blade servers and lack a display device, keyboard, and other components.

The computer 200 is adapted to execute computer program modules for providing functionality described herein. As used herein, the term "module" refers to computer program instructions and other logic used to provide the specified functionality. Thus, a module can be implemented in hardware, firmware, or software. In one embodiment, program modules formed of executable computer program instructions are stored on the storage device 208, loaded into the memory 206, and executed by the processor 202.

Figure 3:
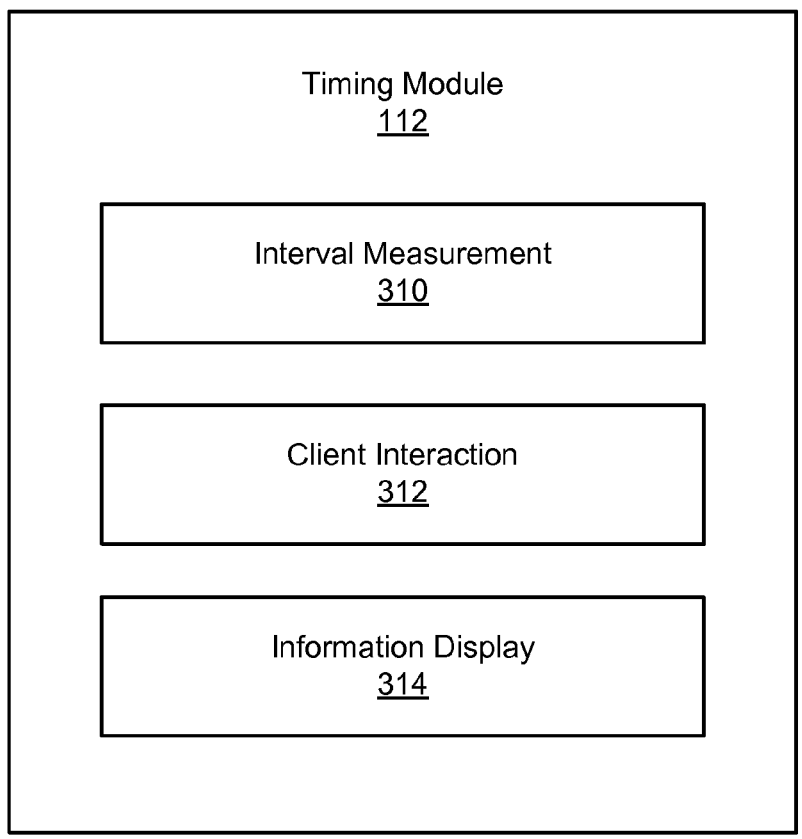
FIG. 3 is a high-level block diagram illustrating a detailed view of the timing module of a client according to one embodiment.

FIG. 3 is a high-level block diagram illustrating a detailed view of the timing module 112 of a client 110 according to one embodiment. As shown in FIG. 3, multiple modules are included within the timing module 112. In some embodiments, the functions are distributed among the modules in a different manner than described herein. Moreover, the functions are performed by other entities in some embodiments, such as by the timing server 130.

An interval measurement module 310 measures reading time intervals between page-turn commands. In one embodiment, the interval measurement module 310 activates a timer upon detecting a page-turn command and uses the timer to measure the time elapsed until a new page-turn command is detected. The interval measurement module 310 stores the measured time intervals in association with the pages of the eBooks to which they pertain.

Different embodiments of the interval measurement module 310 may measure time intervals in various different ways. For example, the interval measurement module 310 may measure only forward page-turn commands because backward page-turn commands are less likely to be reflective of a user's reading speed. In addition, the interval measurement module 310 may measure intervals between multiple page-turn commands and may activate the timer in response to different events, such as the display of a new page instead of the detection of a page turn command. The interval measurement module 310 may also omit measurement of page turn commands that are close in time to events that signify the start or end of a reading session, such as time intervals bordered by the turning on or off of the client 110. However, the interval measurement module 310 may separately record events indicating the start or end of reading sessions.

A client interaction module 312 sends timing reports to the timing server 130. The timing reports indicate the reading time intervals for the pages of eBooks measured by the interval measurement module 310, as well as the events indicating the start or end of a reading session. A timing report may include, for example, an identifier of the client 110 sending the report, an identifier of the eBook being read on the client, an identifier of the user of the client, a description of the text displayed on the page associated with the report (i.e., the beginning and endpoints of the text on the page described by the associated reading time interval), and the time interval itself. The beginning and endpoints of the text may be included in a timing report to normalize data and account for different clients viewing page breaks at different points in the text due to display differences including display size and font size. A timing report may describe time intervals for one or more pages. The timing reports may also include similar information describing the starts and ends of reading sessions. The information in the timing report may be anonymous to avoid disclosing private information about the user or client 110.

The client interaction module 312 may send the timing reports contemporaneously when the timing intervals are measured or send multiple reports in batch. For example, the client interaction module 312 may store timing reports if network 120 connectivity is absent or limited and then send the timing reports once connectivity becomes available, or send timing reports at the completion of a chapter or other location within the text. Likewise, the client interaction module 312 may send timing reports upon initiating or deactivating of the reading functionality of the client 110.

In addition, the client interaction module 312 may request and receive timing and/or interest information from the timing server 130. The timing information may indicate the user's reading speed or describe other timing-related aspects of the eBook. "Reading speed" generally refers to the amount of text a user can read in a specified amount of time. For purposes of convenience, reading speed is often described herein as words per minute (WPM). However, reading speed can be represented in other ways, such as an amount of time required to read a word or other section of text. The interest information may indicate sections of the eBook which are attracting the most attention.

An information display module 314 displays information received from the timing server 130 to the user. The types of information displayed may vary in different embodiments. The information display module 314 may display statistics describing the user's reading speed. The information display module 314 may display the statistics textually or graphically. For example, the information display module 314 may display a dialog box or other user interface (UI) element having a dashboard that lists the user's reading speed. The information display module 314 may likewise use color-coding or another technique to graphically illustrate the differences in reading speed for different sections of the eBook.

Additionally, statistics can indicate that certain sections of an eBook are skipped (e.g., appendix, bibliography, notes) due to a faster than usual reading speed being recorded for the section. The information display module 314 may use textual or graphical techniques to display what sections of an eBook are actually read by users and which are skipped. For example, a histogram may illustrate the number of users that read a section or the percentage of users that read a section. In one embodiment, a user may be asked to rate or comment on an eBook after finishing the eBook. The user may be asked to rate an eBook when the remaining sections of the eBook are read by a number of users that falls below a threshold. For example, the user may be asked to rate the eBook at the beginning of an appendix if few users read the remaining portion of the eBook.

Similarly, the information display module 314 may use textual or graphical techniques to display the interest information. Thus, the information display module 314 can use color-coding of eBook text to identify sections that are most frequently read, or re-read, by the user and/or other users, to indicate sections that tend to mark the start or end of reading sessions, and the like.

Figure 4:
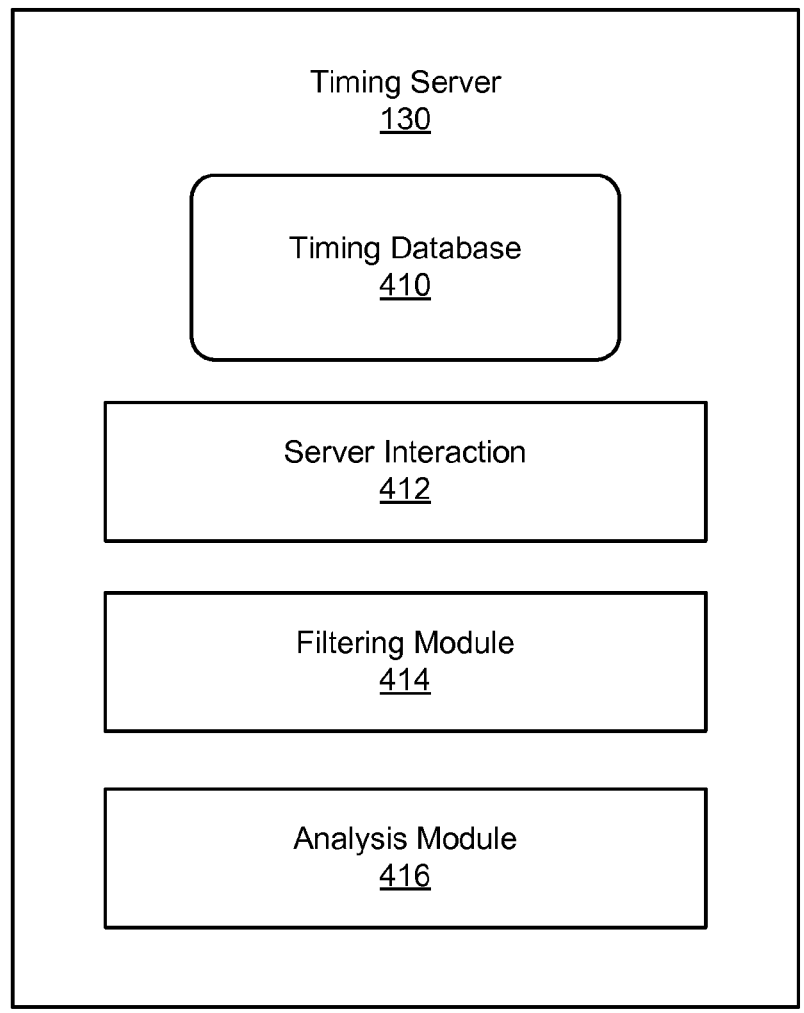
FIG. 4 is a high-level block diagram illustrating a detailed view of the timing server according to one embodiment.

FIG. 4 is a high-level block diagram illustrating a detailed view of the timing server 130 according to one embodiment. As shown in FIG. 4, multiple modules are included within the timing server 130. In some embodiments, the functions are distributed among the modules in a different manner than described herein. Moreover, the functions are performed by other entities in some embodiments, such as by the client 110 or timing module 112.

A timing database 410 is a data store that stores timing reports received from the clients 110. As previously mentioned, the timing reports include time intervals and may also include other information such as a client identifier, a user identifier, an eBook identifier, and a description of the page of the eBook associated with the time interval. In addition, the timing reports may identify events indicating the starts and ends of reading sessions. In one embodiment, the timing database 410 stores the timing reports keyed by the user identifier so that all reports associated with specific users can be identified. The timing database 410 may also store the timing reports keyed by eBook or sections of an eBook, by client 110 or by other keys.

In one embodiment, the timing information in the timing database 410 is updated as new timing reports are received from the clients 110. Alternatively, the timing information may be updated periodically, after a certain amount of time has passed, after a certain number of timing reports have been received, or based on other factors. The timing information may also be weighted based on the number of timing reports received for a particular user/eBook or based on other factors.

In one embodiment, the timing database 410 also stores timing and interest information generated by the timing server 130 from the received timing reports. The timing information may include information associated with specific users, such as average or other reading speeds. In addition, the timing information may include information associated with specific eBooks. The eBook timing information may include reading times (e.g., average reading times) for sections of an eBook. Thus, the eBook timing information may include the average reading times for entire eBooks, chapters of eBooks, and paragraphs, sentences, or other sections of eBooks. The interest information may include information describing the interests in sections of eBooks expressed by users. The interest information may thus describe the amount of attention attracted by different sections within eBooks, sections of eBooks that were read at rates significantly faster or slower than average, and the frequency at which sections of eBooks marked the start or end of reading sessions A server interaction module 412 receives timing reports from the clients 110 and stores the reports in the timing database 410. In addition, the server interaction module 412 receives requests for information from the clients 110 and other parties and provides information from the database 410 in response thereto. The requests may be, for example, requests for the reading speed of a user of a client or for other timing information associated with an eBook being read on that client. Likewise, the requests may be from a publisher, distributor, or marketer of an eBook seeking interest information describing sections of eBooks that tend to mark the start or end of reading sessions, sections of eBooks that are attracting the most interest from users, and other such information.

A filtering module 414 filters timing reports received from the clients 110 to remove reports that are likely erroneous or inaccurate. The filtering module 414 may filter out timing reports that indicate abnormally high or low reading time intervals. These timing reports may result from abnormalities such as the user rapidly flipping forward through the pages of text or being interrupted while reading a page of text. In one embodiment, the filtering module 414 compares reading time intervals in the timing reports with lower and upper thresholds and filters out timing reports not falling within the thresholds. The thresholds can be based on the timing information stored in the timing database 410 or other factors. For example, the thresholds can be based on the average reading time intervals for the text sections described by the reports, on average reading time intervals for the type of client 110 sending the report, average reading time intervals from the user that sent the report, or average reading time intervals across multiple eBooks. Further, the filtering module 414 may filter timing reports based on criteria other than reading time intervals. For example, the filtering module 414 may filter reports from a client 110 that sends an abnormally high volume of reports. The functions of filtering module 414 may also be incorporated within the timing modules 112 of the clients 110 or any other module.

An analysis module 416 analyzes the timing reports in the timing database 410 and generates the timing and interest information. The types of analysis performed and information generated by the analysis module 416 can vary in different embodiments. The analysis module 416 may generate reading speed information for individual users of the clients. To this end, the analysis module 416 calculates statistics from the user's timing reports describing the user's reading speed. For example, the analysis module 416 may calculate the user's average reading speed by dividing the number of words in a section of one or more eBooks by the amount of time required by the user to read the section. The section of the eBook used to perform the calculation can be a page or subset of pages in an eBook, an entire eBook, or multiple eBooks, depending upon the embodiment.

Similarly, the analysis module 416 may generate combined reading speed information for a group of users of the clients 110. As with individual readers, the combined reading speed information is a statistical measure describing the time required by the group of users to read a section of one or more eBooks. For clarity, this description often refers to the combined reading speed as being the average reading speed of the group of users. However, the combined reading speed may be represented by other statistical measures, such as the median reading speed of the users in the group.

The analysis module 416 may select the group of users for which the combined reading speed information is generated based on a variety of factors. The analysis module 416 may select a group of users who have read a particular eBook or set of eBooks. The analysis module 416 can use this group of users to generate, e.g., the average reading speed of the group of users for the eBook. The analysis module 416 may also select groups of users based on demographic information of the users, geographic locations of the users, etc.

Further, the analysis module 416 may generate reading speed information associated with specific sections of an eBook. In general, reading speeds often vary over sections of an eBook. For example, the reading speed might be slower for a section of an eBook that includes mathematical equations or particularly dense prose than for other sections of the eBook. Hence, the analysis module 416 generates reading speed information that describes the reading speeds of particular sections of eBooks relative to other sections. This reading speed information may be represented in multiple ways. In one embodiment, the analysis module 416 specifies the reading speed for a particular section (e.g., a chapter) as the average reading speed of readers of that chapter. For example, the analysis module 416 can specify a reading speed of 50 WPM for a dense chapter, and of 150 WPM for a different, easier-to-read, chapter. In another embodiment, the analysis module 416 specifies the reading speed for a section of an eBook as a scale factor relative to a base reading speed. For example, the analysis module 416 can specify that the reading speed of the dense chapter is 50% of the average reading speed of a group of users for the entire eBook in which the chapter is contained.

In addition, the analysis module 416 may analyze the timing reports and timing information to produce the interest information. In one embodiment, the analysis module 416 identifies sections of eBooks that are read more frequently than other sections. For example, the analysis module 416 may examine the aggregate timing reports for a particular eBook to identify sections of the eBook that were read more frequently than other sections and hence attract the most interest.

The analysis module 416 may also examine the timing reports and timing information to identify sections of an eBook that were read significantly faster or slower than other sections of the eBook. The relative reading speeds of the various sections may serve as a signal of interest in the sections. For example, the analysis module 416 may determine that a page read relatively slowly is interesting because users tend to spend more time reading it than other pages.

The analysis module 416 may also examine the timing reports describing the starts and ends of reading sessions to produce the interest information. The positions in an eBook that mark the end of reading sessions may signify sections of the eBook that are less interesting to users. As part of this examination, the analysis module 416 may also consider whether the users returned to read sections of the eBook located after the position that ended a reading session, whether the users skipped ahead in the eBook, and whether the users abandoned reading the eBook altogether. For example, a preponderance of users stopping reading at a certain point and then resuming reading soon after may indicate that the preceding section of the eBook is particularly interesting because user continued reading after it. Conversely, a preponderance of users stopping reading at a certain point and not returning to the eBook for an extended period of time may indicate that the preceding section of the eBook was uninteresting and caused the users to stop reading the eBook. Similarly, the analysis module 416 may find that sections of an eBook located immediately after positions that mark the beginning of reading sessions are more interesting to users than other sections.

In one embodiment, after determining the combined reading speed of a section is abnormally high or low, the user of an eBook reader may be asked for feedback on the section. For example, the reader may indicate the cause for an abnormally high or reading speed in a section of an eBook. Responses available to the reader may include various positive and negative reasoning for the abnormal reading speed as well as a response indicating an unknown cause.

Figure 5:
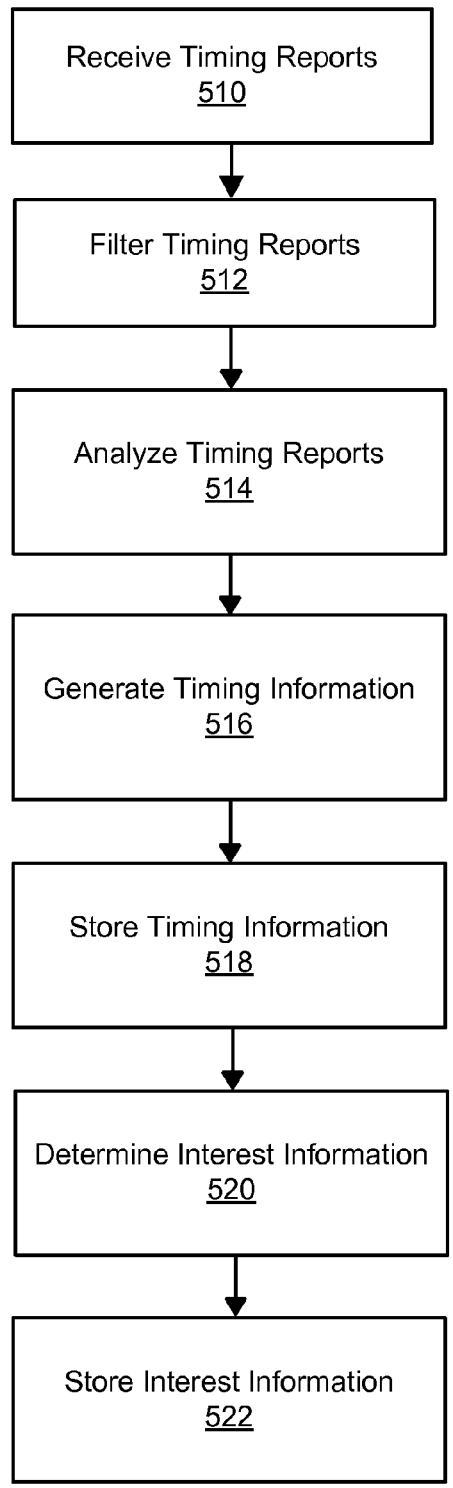
FIG. 5 is a flowchart illustrating a method of using eBook reading data to generate interest information according to one embodiment.

FIG. 5 is a flowchart illustrating a method of using eBook reading data to generate interest information according to one embodiment. While this description ascribes the steps of the method to the timing server 130, the clients 110 or other entities can perform some or all of the steps in other embodiments. In addition, the method can perform the steps in different orders or include different steps.

In step 510, the timing server 130 receives timing reports from the clients 110 describing the reading time intervals for sections (e.g., pages) of eBooks. The reports may include identifiers of the client 110, user, and eBook, a description of the text displayed on the page associated with the report, and the time interval. The timing reports may also indicate the starts and ends of reading sessions. In step 512, the timing server 130 filters the reports to remove reports that are likely erroneous or inaccurate, and stores the remaining reports in the timing database 410.

In steps 514 and 516, the timing server 130 analyzes the timing reports and generates the timing information. This analysis 514 may include generating reading speed information for individual users and for groups of users. In step 518, the timing server 130 stores the timing information in the timing database 410. In step 520, the timing server 130 analyzes the timing reports and timing information to determine interest information. The interest information may indicate interests in sections of eBooks expressed by users and groups of users. In step 522, the interest information is stored in the timing database 410. The timing and interest information may be provided to users of clients 110 or other interested parties.

Figure 6:
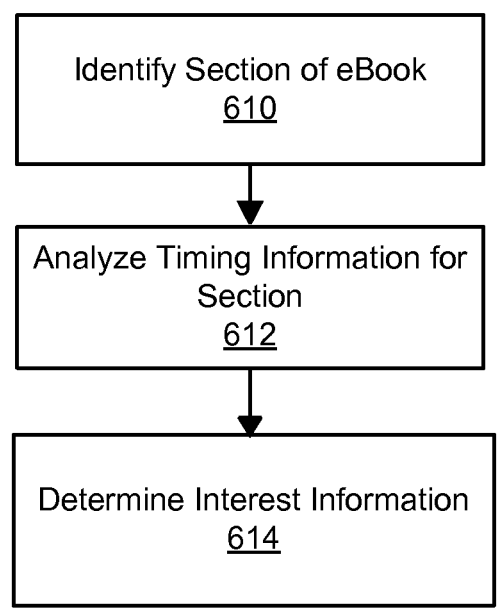
FIG. 6 is a flowchart illustrating a method of determining interest information for a section of an eBook according to one embodiment.

FIG. 6 is a flowchart illustrating a method of determining interest information for a section of an eBook according to one embodiment. While this description ascribes the steps of the method to the timing server 130, other entities can perform some or all of the steps in other embodiments. In addition, the method can perform the steps in different orders or include different steps.

In step 610, the timing server 130 identifies a section of an eBook for which interest information is to be determined. For example, the section may be the eBook as a whole, a section within identified start and end points, or a chapter, paragraph, or other section of the eBook. In step 612, the timing server 130 analyzes timing information associated with the section of the eBook. The timing server 130 may perform this analysis, for example, by retrieving timing information from the timing database 410 for the section. The analysis may indicate, for example, sub-sections within the section that are read more frequently than other sub-sections, reading speed variation within the section, and locations within the section where users tended to start or end reading sessions. In step 614, the timing server 130 uses the results of the analysis to determine the interest information associated with the section of the eBook.

In one embodiment, the interest information is provided to eBook publishers, marketers, sellers and other parties. These parties may use the interest information to determine how users are reading the book. For example, a party may use the interest information to identify interesting sections of an eBook that can be featured in previews, samples, and summaries of the eBook, to identify positions where users tend to abandon reading the eBook, and for use as signals in ranking eBooks or sections of eBooks in search results. In search results, interest information may be used to rank sections within a single eBook, or throughout multiple eBooks. The interest information associated with a section of an eBook can be used as a signal when ranking results of a search engine. Entire eBooks may be ranked individually based on aggregate interest information such as average interest or peak interest. For example, a user may enter a search query which returns a set of eBooks. In one embodiment, the set of eBooks is presented with the eBooks ranked by average interest or the average interest is otherwise taken into account when determining a ranking.

Some sections of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for using eBook reading data for document understanding. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method of generating interest information for an eBook, comprising:
receiving timing reports from a plurality of clients used by a plurality of users to read the eBook, the timing reports describing behaviors of the users with respect to sections of the eBook and describing events that signify starts and ends of reading sessions of the eBook by the users, a start of a reading session indicated by turning on a client and an end of a reading session indicated by turning off a client;
analyzing the timing reports for the eBook received from the plurality of clients used by the plurality of users to identify a position in the eBook in which a preponderance of the plurality of users ended a reading session and did not start a new reading session for the eBook for at least a threshold period of time;
generating interest information for the eBook responsive to the analysis of the timing reports, the interest information indicating that a section of the eBook preceding the identified position is of low interest to the plurality of users; and
storing the interest information for the eBook in a data store.

2. The method of claim 1, wherein the timing reports describe reading time intervals for pages of the eBook displayed by the clients, and wherein the analyzing further comprises analyzing the reading time intervals to determine reading speeds associated with the sections of the eBook and determining the interest information responsive to the reading speeds.

3. The method of claim 1, wherein the timing reports indicate frequencies that the sections of the eBook are read by the users, and wherein the analyzing further comprises determining the interest information responsive to the frequencies that the sections of the eBook are read.

4. The method of claim 1, further comprising:
analyzing the timing reports for the eBook to determine statistics describing the reading speeds of the users; and
providing the statistics describing the reading speeds of the users to a client for display to a user.

5. The method of claim 1, further comprising:
providing the interest information to a requesting party, the requesting party adapted to use the interest information to identify positions in the eBook where users tend to abandon reading the eBook.

6. A computer-implemented system for generating interest information for an eBook comprising:
a non-transitory computer-readable storage medium having executable computer program instructions comprising instructions for:
receiving timing reports from a plurality of clients used by a plurality of users to read the eBook, the timing reports describing behaviors of the users with respect to sections of the eBook and describing events that signify starts and ends of reading sessions of the eBook by the users, a start of a reading session indicated by turning on a client and an end of a reading session indicated by turning off a client;
analyzing the timing reports for the eBook received from the plurality of clients used by the plurality of users to identify a position in the eBook in which a preponderance of the plurality of users ended a reading session and did not start a new reading session for the eBook for at least a threshold period of time;
generating interest information for the eBook responsive to the analysis of the timing reports, the interest information indicating that a section of the eBook preceding the identified position is of low interest to the plurality of users; and
storing the interest information for the eBook in a data store; and
a processor for executing the computer program instructions.

7. The system of claim 6, wherein the timing reports describe reading time intervals for pages of the eBook displayed by the clients, and wherein the analyzing further comprises analyzing the reading time intervals to determine reading speeds associated with the sections of the eBook and determining the interest information responsive to the reading speeds.

8. The system of claim 6, wherein the timing reports indicate frequencies that the sections of the eBook are read by the users, and wherein the analyzing further comprises determining the interest information responsive to the frequencies that the sections of the eBook are read.

9. The system of claim 6, further comprising instructions for:
analyzing the timing reports for the eBook to determine statistics describing the reading speeds of the users; and
providing the statistics describing the reading speeds of the users to a client for display to a user.

10. The system of claim 6, further comprising instructions for:
providing the interest information to a requesting party, the requesting party adapted to use the interest information to:
identify positions in the eBook where users tend to abandon reading the eBook.

11. A non-transitory computer-readable storage medium storing executable computer program instructions for generating interest information for an eBook, the instructions performing steps comprising:

receiving timing reports from a plurality of clients used by a plurality of users to read the eBook, the timing reports describing behaviors of the users with respect to sections of the eBook and describing events that signify starts and ends of reading sessions of the eBook by the users, a start of a reading session indicated by turning on a client and an end of a reading session indicated by turning off a client;

analyzing the timing reports for the eBook received from the plurality of clients used by the plurality of users to identify a position in the eBook in which a preponderance of the plurality of users ended a reading session and did not start a new reading session for return to the eBook for at least a threshold period of time;

generating interest information for the eBook responsive to the analysis of the timing reports, the interest information indicating that a section of the eBook preceding the identified position is of low interest to the plurality of users; and storing the interest information for the eBook in a data store.

12. The computer-readable storage medium of claim 11, wherein the timing reports describe reading time intervals for pages of the eBook displayed by the clients, and wherein the analyzing further comprises analyzing the reading time intervals to determine reading speeds associated with the sections of the eBook and determining the interest information responsive to the reading speeds.

13. The computer-readable storage medium of claim 11, wherein the timing reports indicate frequencies that the sections of the eBook are read by the users, and wherein the analyzing further comprises determining the interest information responsive to the frequencies that the sections of the eBook are read.

14. The computer-readable storage medium of claim 11, the steps further comprising:

analyzing the timing reports for the eBook to determine statistics describing the reading speeds of the users; and providing the statistics describing the reading speeds of the users to a client for display to a user.

15. The computer-readable storage medium of claim 11, the steps further comprising:

providing the interest information to a requesting party, the requesting party adapted to use the interest information to identify positions in the eBook where users tend to abandon reading the eBook.

\* \* \* \* \*